US009568334B1

(12) United States Patent
Thompson

(10) Patent No.: US 9,568,334 B1
(45) Date of Patent: Feb. 14, 2017

(54) SAFE DRIVING SYSTEM GENERATING MAP POINTS

(71) Applicant: Demetrius Thompson, Woodland Hills, CA (US)

(72) Inventor: Demetrius Thompson, Woodland Hills, CA (US)

( * ) Notice: Subject to any disclaimer, the term of this patent is extended or adjusted under 35 U.S.C. 154(b) by 0 days.

(21) Appl. No.: 14/810,970

(22) Filed: Jul. 28, 2015

(51) Int. Cl.
*G01C 21/34* (2006.01)
*G01S 19/13* (2010.01)
*G01C 21/36* (2006.01)

(52) U.S. Cl.
CPC ....... *G01C 21/3682* (2013.01); *G01C 21/3629* (2013.01); *G01C 21/3632* (2013.01); *G01S 19/13* (2013.01)

(58) Field of Classification Search
CPC ................................. G01C 21/34; G01S 19/13
USPC ....... 701/438, 468, 533; 340/929; 455/414.1
See application file for complete search history.

(56) References Cited

U.S. PATENT DOCUMENTS

| | | | | |
|---|---|---|---|---|
| 8,175,800 B2* | 5/2012 | Nakayama | ......... | G01C 21/3629 701/410 |
| 2006/0271284 A1* | 11/2006 | Watanabe | ............ | G01C 21/367 701/431 |
| 2007/0005241 A1* | 1/2007 | Sumizawa | ............. | G09B 29/10 701/437 |
| 2008/0027632 A1* | 1/2008 | Mauderer | ............ | G09B 29/102 701/532 |
| 2008/0167813 A1* | 7/2008 | Geelen | ............... | G01C 21/3641 701/469 |
| 2011/0098916 A1* | 4/2011 | Jang | ................... | G01C 21/3697 701/533 |
| 2012/0221243 A1* | 8/2012 | Basson | .................. | G01C 21/34 701/468 |
| 2013/0289805 A1* | 10/2013 | Makkinejad | .......... | B61L 25/025 701/19 |
| 2015/0046038 A1* | 2/2015 | Kawamata | ............ | B60W 30/09 701/41 |
| 2015/0262483 A1* | 9/2015 | Sugawara | ............ | G08G 1/0962 340/929 |
| 2016/0157067 A1* | 6/2016 | Capota | .................... | H04W 4/12 455/414.1 |

* cited by examiner

Primary Examiner — Tan Q Nguyen
(74) Attorney, Agent, or Firm — Berliner & Associates

(57) ABSTRACT

A method for improving safety for use with a navigation GPS map system that can display the current location of a vehicle that contains the navigation system on a map generated by the system, the method warning of an approaching point of interest selected from a traffic light, a school zone, or a railway crossing that the vehicle is approaching by displaying an icon of the traffic light, school zone or railway crossing. The display can be limited to when a wireless communication device in the vehicle is in an active voice mode.

15 Claims, 5 Drawing Sheets continued next sheet

SAFE DRIVING SYSTEM GENERATING MAP POINTS

FIELD OF THE INVENTION

The invention relates to a method for generating map points in a vehicle.

BACKGROUND OF THE INVENTION

Talking on a phone while driving, whether with a hand-held phone or using an in-dash phone, is a major and dangerous distraction, to the point that a number of states have passed laws making it a misdemeanor to use of a hand-held phone while driving. A significant solution can be found U.S. Pat. Nos. 7,308,247 and 7,986,934, each tilted "Cellular Telephone Safety System" and which describe detecting when a traffic signal is near when a wireless communication device is in use and issuing an alarm, and which can be used to warn that the traffic light is red or is calculated to be red by the time the vehicle reaches the intersection. Such a system can also be used to generate a warning when the vehicle is approaching a school zone or a railway crossing. The teachings of U.S. Pat. Nos. 7,308,247 and 7,986,934, and the references cited therein are incorporated by reference herein. Vehicle GPS navigation systems and mobile GPS navigation systems display the location of the user on a map generated by the system. Such systems are capable of displaying icons showing locations on the map of various points of interest chosen by the user, such as ATMs, restaurants, fire stations, police stations, emergency rooms, and the like.

BRIEF SUMMARY OF THE INVENTION

The present invention provides a warning for vehicle navigation GPS map systems and mobile GPS map systems that display the location of the user on a map generated by the system. The warning can be an icon of a point of interest ("POI") selected from a traffic light, a school zone, or a railway crossing that the vehicle is approaching. Optionally a marker line, such as a yellow line, can be drawn on the map from the present location to the displayed POI. When warning of a traffic light, the system can be limited to display the traffic signal icon only when the user is approaching a yellow light or a red light, thereby emphasizing the importance of the warning and avoiding warning fatigue. In addition, or alternatively, the display of the traffic signal icon, whether or not the traffic light is green, yellow or red, can be limited when a driver is talking on the phone, i.e., when the wireless device is in an active voice mode as described in the above-noted U.S. Pat. Nos. 7,308,247 and 7,986,934. When the phone is in use when approaching a traffic light, a school zone, or a railway crossing, an icon of a telephone can also appear on the display.

In a specific embodiment, a method for improving safety for use with a navigation GPS map system that can display the current location of a vehicle that contains the navigation system on a map generated by the system, and in which a wireless communication device is used in a moving vehicle, the method warning of an approaching point of interest selected from a traffic light, a school zone, or a railway crossing that the vehicle is approaching, comprising exercising the following steps by means of as computer program:
(a) determining the current location of the vehicle;
(b) determining if the vehicle is moving
(c) determining the GPS location of the point of interest;
(d) determining if the location of the point of interest is within a predetermined distance from the point of interest;
(e) determining if the wireless communication device is in an active voice mode; and
(e) displaying an icon of the point of interest on the map in response to determining that (i) the vehicle is within the predetermined distance, (ii) the vehicle is moving, and (iii) the wireless communication device is in an active voice mode whereupon an icon of the point of interest is displayed.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
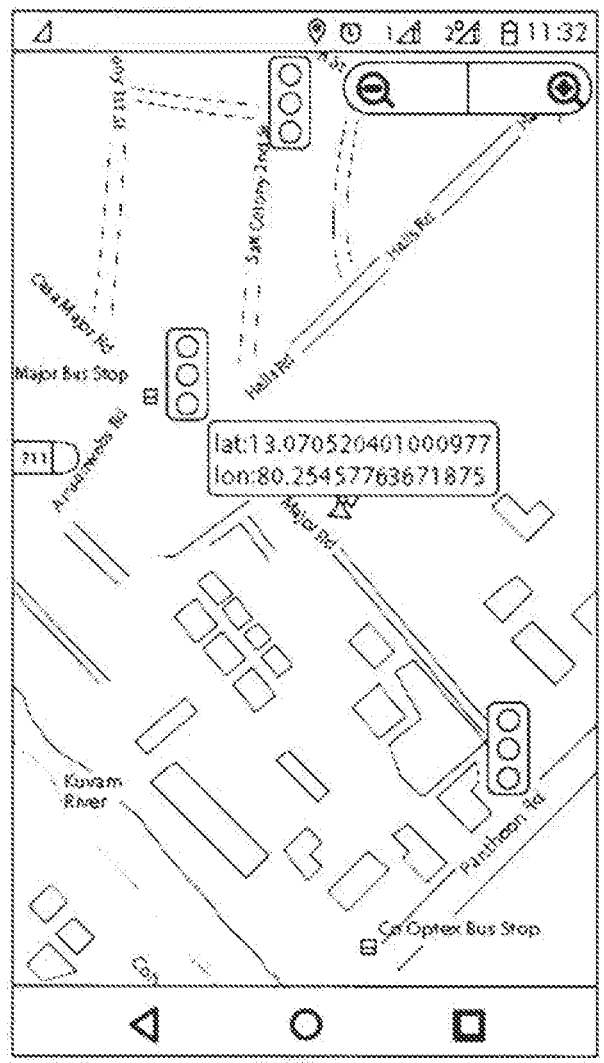
FIG. 1 is depiction of one embodiment of the invention, in which a hand-held GPS navigation system map showing an icon of a traffic light at the top of the display as well as showing the icon of a traffic light near the location of the user's vehicle.

Referring to FIG. 1, a hand-held GPS navigation system map is shown in a first embodiment of the invention. An icon of a traffic light is depicted at the top of the display to indicate that a traffic light is near. In addition, an icon of a traffic light is shown near the location of the user's vehicle along with the position of the user both in latitude and longitude readings as well as a graphic position indicator.

Figure 2:
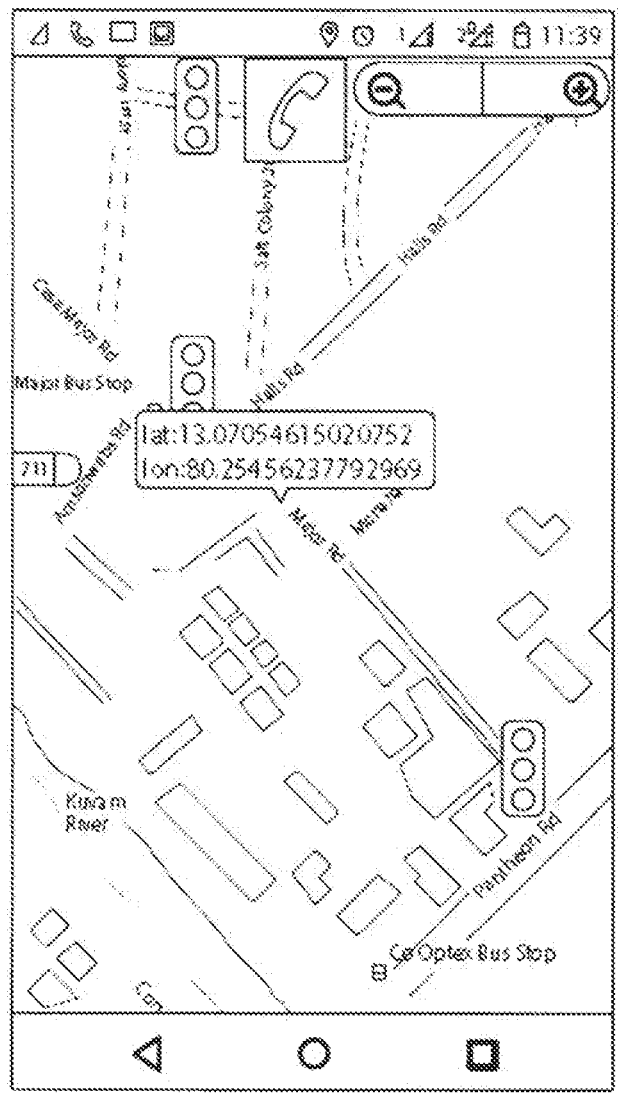
FIG. 2 is a depiction of a second embodiment of the invention, in which a hand-held GPS navigation system map showing an icon of a traffic light at the top of the display as well as showing the icon of a telephone.

In FIG. 2, a hand-held GPS navigation system map is shown as in a first embodiment of the invention to indicate that a traffic light is near, and an icon of a phone is also shown to indicate that the user in on the phone in an active voice mode.

Figure 3:
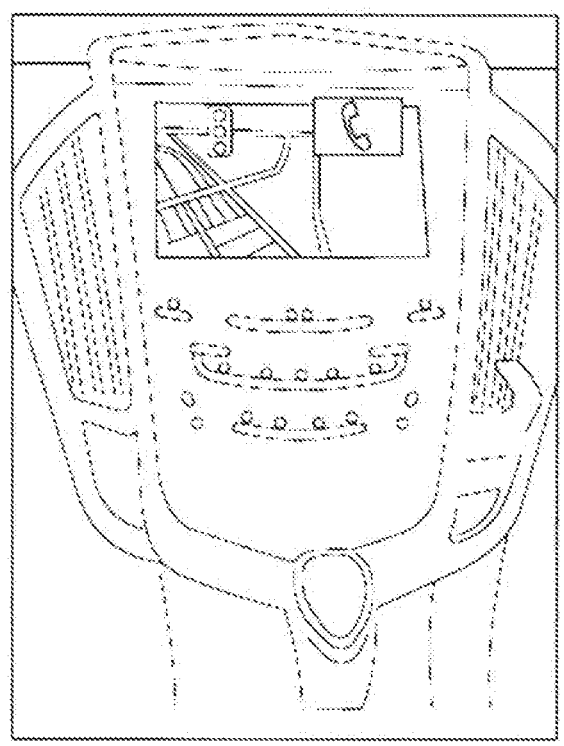
FIG. 3 is a depiction of the dashboard area of a car with a navigation system installed and depicts a warning traffic light icon as well as the icon of a telephone.

In FIG. 3, a system map of a GPS navigation system installed in the dashboard of a car is shown with the icon of a traffic light prominently shown along with the icon of a telephone. The telephone icon indicates that someone in the car is using a phone, either a telephone installed in the car or a mobile phone connected by Bluetooth to the navigation system display. An active Bluetooth connection can itself be used to indicate that the user in on the phone in an active voice mode.

In any of FIGS. 1-3, in place of a traffic light icon, an icon of a different POI, i.e., of a school or the barrier of a railway crossing can be displayed when the vehicle is respectively approaching a school or a railway crossing. In addition to the display of one or more icons, a warning audible alarm can optionally be sounded.

GPS is the most accurate and widespread global positioning system, accurate in most cases to 3 meters or less; and A-GPS, a modification of GPS, is widely deployed in current cellular phones in order to comply with the U.S. E-911 system requirements; in the future all or almost all U.S. cellular providers or equipment manufacturers will support location-based services via A-GPS (or a similar method). Latitude and longitude coordinates for signal light-controlled intersections or schools or railway crossings, are obtained from a provider of such GPS coordinates such as deCarta, an LBS (location based services) platform company. When the navigation system device is in use, the device's current coordinates are continually read from the GPS unit that is contained in, attached to, or otherwise linked with the device. If a change in coordinates indicates that the speed of the device exceeds a certain level, say 10 mph, or that the current coordinates of the device are within a certain distance, say 250 feet (very roughly one half to one quarter of a city block) of the coordinates of the location of a POI such as a traffic light (the "warning coordinates"), that the change in coordinates indicates that the vehicle is moving towards the POI, the navigation system displays the appropriate icon on its map.

Figure 4:
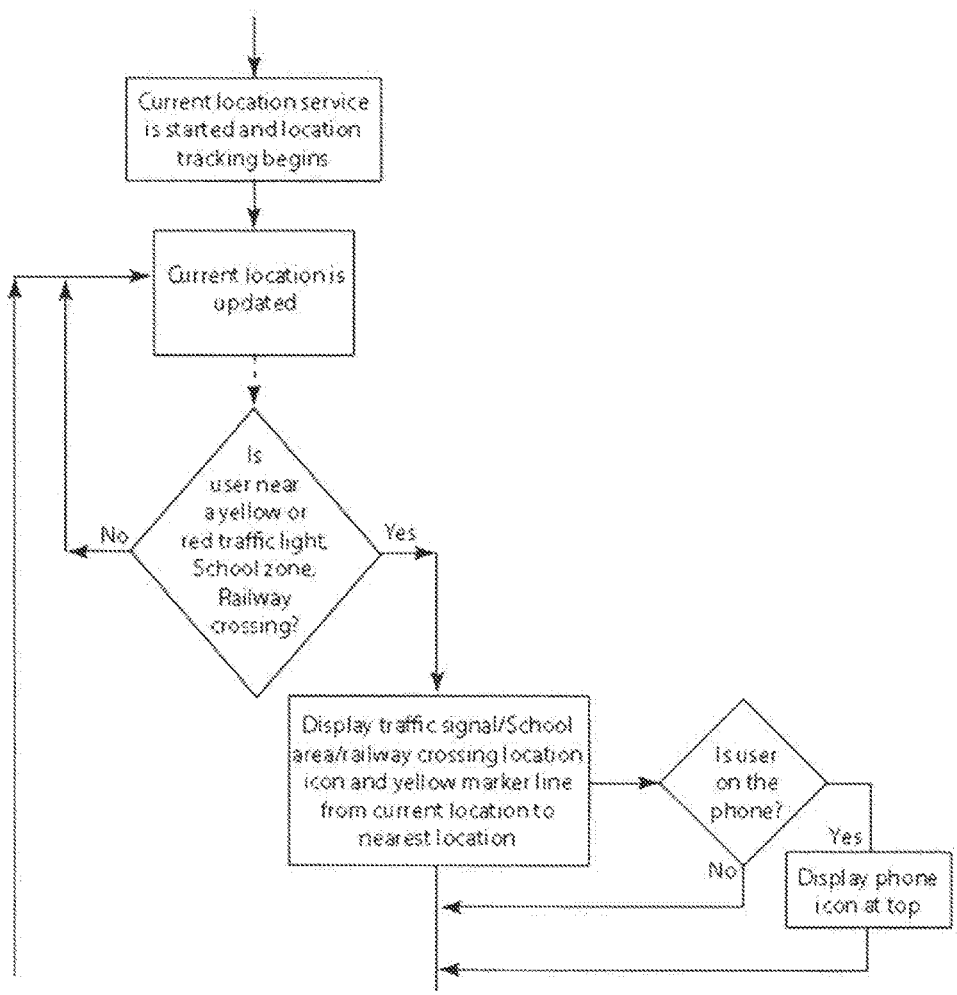
FIG. 4 is a flowchart illustrating operation of the method.
Figure 4:
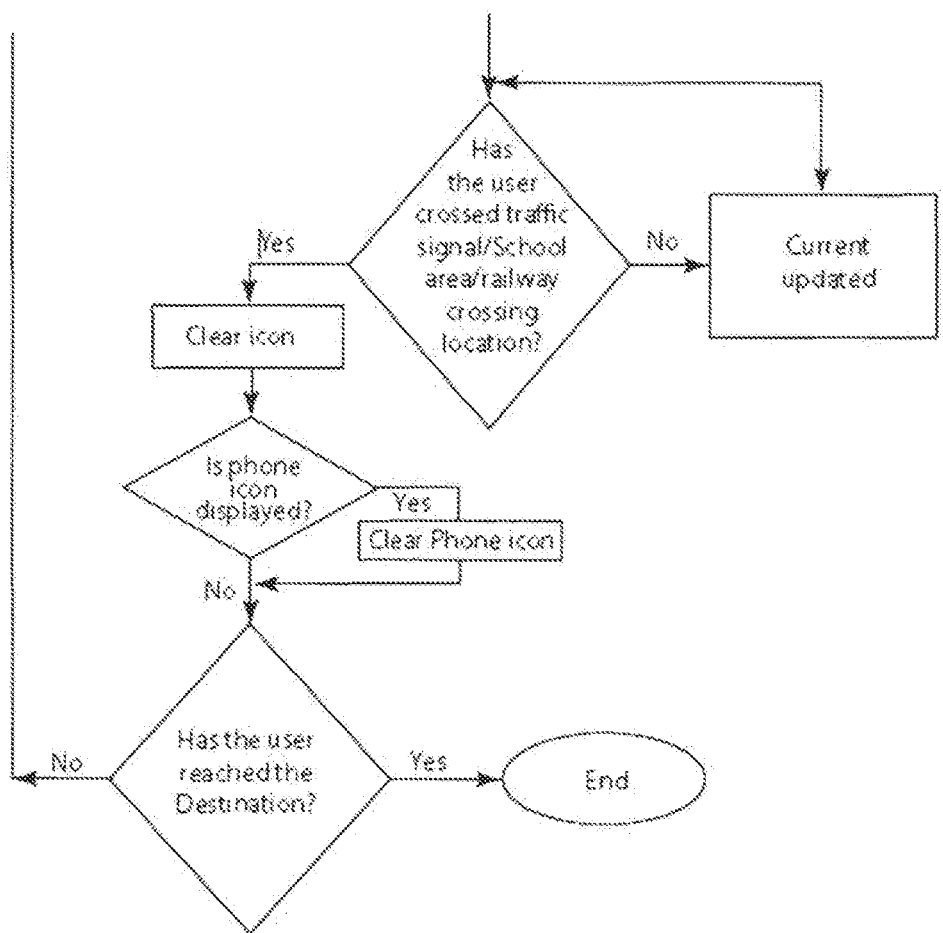

FIG. 4 is flowchart illustrating operation of the method. It is described with respect to a GPS navigation system installed in the dashboard of a car as in FIG. 3 and is set to display one or more points of interest ("POI") selected from traffic lights school zones and railway crossings. At the start, a software program in the car is started and updates the current GPS location of the car. Using a downloaded database of traffic light GPS vector map locations, such as maintained by deCarta, and current location information, the software determines whether the user is near (e.g., 250 feet) one of the POIs. If not, then the software continues to update the current location. If the software determines that the user is near one of the POIs, the software displays the relevant icon for the traffic light, school zone, or railway crossing. Either before or after the foregoing display, the software detects whether a phone is in voice mode. If it is, then the icon of a phone is also displayed, at the top of the navigation map.

The software then determines whether the user has crossed the traffic tight, school zone or railway crossing. If not, then the current location is updated. If yes, then the POI icon is cleared and if the phone icon was displayed, it also is cleared, as well as is any marker line.

If a final destination was entered into the navigation system, then the software determine whether the destination has been reached. If not then the current location is continued to be determined. If yes, then the program ends.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A method for improving safety for use with a navigation GPS map system that can display the current location of a vehicle that contains the navigation system on a map generated by the system and in which a wireless communication device is being used in the vehicle, the method warning of an approaching point of interest selected from a traffic light, a school zone, or a railway crossing that the vehicle is approaching, comprising exercising the following steps by means of as computer program:
   (a) determining the current location of the vehicle;
   (b) determining the GPS location of the point of interest;
   (c) determining if the location of the point of interest is within a predetermined distance from the point of interest;
   (d) determining if the vehicle is moving; and
   (e) determining if the wireless communication device is in an active voice mode whereupon an icon of the point of interest is displayed only if such determination is positive.

2. The method of claim 1 including the step of displaying an icon of a phone only if the determination that the wireless communication device is in an active voice mode is positive.

3. The method of claim 1 in which in addition to an icon of the point of interest being displayed, an audible alarm is sounded.

4. The method of claim 1 in which the map displays a line from the present location to the displayed point of interest.

5. The method of claim 1 wherein the point of interest is a traffic light and the icon is an icon of a traffic light.

6. The method of claim 5 including the step of determining if the traffic light is a yellow light or a red light or is calculated to be yellow or red by the time the vehicle reaches the traffic light, and displaying said icon only if such determination is positive.

7. The method of claim 1 wherein the point of interest is a school zone and the icon is an icon of a school.

8. The method of claim 1 wherein the point of interest is a railway crossing and the icon is an icon of a railway crossing barrier.

9. A method for improving safety for use with a navigation GPS map system that can display the current location of a vehicle that contains the navigation system on a map generated by the system, and in which a wireless communication device is used in a moving vehicle, the method warning of an approaching point of interest selected from a traffic light, a school zone, or a railway crossing that the vehicle is approaching, comprising exercising the following steps by means of as computer program:
   (a) determining the current location of the vehicle;
   (b) determining if the vehicle is moving
   (c) determining the GPS location of the point of interest;
   (d) determining if the location of the point of interest is within a predetermined distance from the point of interest;
   (e) determining if the wireless communication device is in an active voice mode; and
   (f) displaying an icon of the point of interest on the map in response to determining that (i) the vehicle is within the predetermined distance, (ii) the vehicle is moving, and (iii) the wireless communication device is in an active voice mode, then an icon of the point of interest is displayed only if such determination is positive.

10. The method of claim 9 in which in addition to an icon of the point of interest being displayed, an audible alarm is sounded.

11. The method of claim 9 in which the map displays a line from the present location to the displayed point of interest.

12. The method of claim 9 wherein the point of interest is a traffic light and the icon is an icon of a traffic light.

13. The method of claim 12 including the step of determining if the traffic light is a yellow light or a red light or is calculated to be yellow or red by the time the vehicle reaches the traffic light, and displaying said icon only if such determination is positive.

14. The method of claim 9 wherein the point of interest is a school zone and the icon is an icon of a school.

15. The method of claim 9 wherein the point of interest is a railway crossing and the icon is an icon of a railway crossing barrier.

* * * * *